US010232949B2

(12) United States Patent
English et al.

(10) Patent No.: US 10,232,949 B2
(45) Date of Patent: Mar. 19, 2019

(54) ICE PROTECTION SYSTEM (71) Applicant: GKN AEROSPACE SERVICES LIMITED, East Cowes (GB)

(72) Inventors: Peter English, Luton (GB); Thomas Stephen Rowe Richards, Luton (GB); David John Armstrong, Luton (GB)

(73) Assignee: GKN Aerospace services Limited, Isle of Wight (GB)

(*) Notice: Subject to any disclaimer, the term of this patent is extended or adjusted under 35 U.S.C. 154(b) by 142 days.

(21) Appl. No.: 14/770,837

(22) PCT Filed: Feb. 28, 2014

(86) PCT No.: PCT/GB2014/050593
§ 371 (c)(1),
(2) Date: Aug. 27, 2015

(87) PCT Pub. No.: WO2014/132070
PCT Pub. Date: Sep. 4, 2014

(65) Prior Publication Data
US 2016/0009400 A1    Jan. 14, 2016

(30) Foreign Application Priority Data
Feb. 28, 2013    (GB) .................... 1303612.4

(51) Int. Cl.
*B64D 15/22*    (2006.01)
*B64D 15/20*    (2006.01)
(52) U.S. Cl.
CPC ............. *B64D 15/22* (2013.01); *B64D 15/20* (2013.01)
(58) Field of Classification Search
CPC ........ B64D 15/20; B64D 15/22; B64D 15/12; B64D 15/14; G08B 19/02
(Continued)

(56) References Cited

U.S. PATENT DOCUMENTS 2,359,787 A * 10/1944 Peters .................... B64D 15/20
219/502
2,480,846 A * 9/1949 Friedman ............... B64D 15/20
340/580
(Continued)

FOREIGN PATENT DOCUMENTS

CN    102791579 A    11/2012
CN    102811907 A    12/2012
(Continued)

OTHER PUBLICATIONS

Examination Report for EP Application No. 14709385.0 dated Jun. 7, 2016 (5 pages).
(Continued)

*Primary Examiner* — Philip J Bonzell
*Assistant Examiner* — Alexander V. Giczy
(74) *Attorney, Agent, or Firm* — Bejin Bieneman PLC (57) ABSTRACT

An ice-protection system has first and second zones of a leading edge of an aerodynamic or streamlined aerodynamic component, each zone having a de-icing apparatus and an ice-detection sensor positioned behind an elongated convex window as to be aero-conformal with the leading edge. The ice-detection sensor is in the form of a module and has a sensor head having a front face and abutments at ends of the window. The ice-detection sensors may have a central light emitter and a plurality of sensor elements peripheral to the light emitter. The ice-protection system also has a control system responsive to the ice-detection sensors to control the respective de-icing apparatus, and may activate automatically a sequence of operation.

20 Claims, 8 Drawing Sheets

FIG. 4C (58) Field of Classification Search
USPC .......................................... 73/170.26, 170.02
See application file for complete search history.

(56) References Cited

U.S. PATENT DOCUMENTS

| | | | | |
|---|---|---|---|---|
| 3,517,900 | A * | 6/1970 | Roussel | B64D 15/20 244/134 R |
| 4,819,480 | A * | 4/1989 | Sabin | B64D 15/20 244/134 F |
| 5,296,853 | A * | 3/1994 | Federow | B64D 15/20 244/134 F |
| 5,484,121 | A * | 1/1996 | Padawer | B64D 15/20 244/134 F |
| 5,748,091 | A * | 5/1998 | Kim | G08B 19/02 244/134 F |
| 5,772,153 | A * | 6/1998 | Abaunza | B64D 15/20 244/134 F |
| 6,052,056 | A * | 4/2000 | Burns | B64D 15/20 250/573 |
| 6,237,874 | B1 * | 5/2001 | Rutherford | B64D 15/14 244/134 D |
| 6,304,194 | B1 * | 10/2001 | McKillip | B64D 15/20 340/580 |
| 6,384,611 | B1 * | 5/2002 | Wallace | B64D 15/20 324/671 |
| 7,370,525 | B1 * | 5/2008 | Zhao | B64D 15/20 73/170.17 |
| 7,586,419 | B2 * | 9/2009 | Ikiades | G08B 19/02 324/671 |
| 7,969,566 | B2 * | 6/2011 | Smith | G01N 21/15 340/583 |
| 2004/0149734 | A1 * | 8/2004 | Petrenko | B60S 1/026 219/538 |
| 2005/0263646 | A1 | 12/2005 | Nichols | |
| 2007/0001861 | A1 * | 1/2007 | Levine | G08B 19/02 340/583 |
| 2007/0216536 | A1 * | 9/2007 | Alfano | G08B 19/02 340/583 |
| 2008/0099617 | A1 * | 5/2008 | Gilmore | B64D 15/14 244/134 R |
| 2008/0111028 | A1 * | 5/2008 | Kumar | B64D 15/14 244/134 D |
| 2010/0123044 | A1 * | 5/2010 | Botura | B64D 15/14 244/134 D |
| 2010/0155539 | A1 * | 6/2010 | Press | B64D 15/20 244/134 R |
| 2010/0243811 | A1 * | 9/2010 | Stothers | B64D 15/14 244/134 R |
| 2011/0233340 | A1 * | 9/2011 | Christy | B64D 15/14 244/134 D |
| 2011/0290784 | A1 * | 12/2011 | Orawetz | B64D 15/12 219/486 |
| 2012/0057238 | A1 * | 3/2012 | Byren | F42B 10/46 359/588 |
| 2012/0091276 | A1 | 4/2012 | Al-Khalil | |
| 2013/0238282 | A1 * | 9/2013 | Figueroa-Karlstrom | B64D 15/20 702/170 |
| 2013/0284856 | A1 * | 10/2013 | Botura | B64D 15/12 244/134 D |

FOREIGN PATENT DOCUMENTS

| | | | |
|---|---|---|---|
| EP | 1757519 A | 2/2007 | |
| EP | 2058228 A2 | 5/2009 | |
| GB | 833675 A | 4/1960 | |
| GB | 2447374 A | 9/2008 | |
| GB | 2477336 A | 8/2011 | |
| GB | 2477337 A | 8/2011 | |
| GB | 2477338 A | 8/2011 | |
| GB | 2477339 A | 8/2011 | |
| GB | 2477340 A | 8/2011 | |
| WO | 0111582 A1 | 2/2001 | |
| WO | 2004110865 A1 | 12/2004 | |
| WO | 2011087412 A1 | 7/2011 | |
| WO | WO 2011092483 A1 * | 8/2011 | ............ B64D 15/12 |
| WO | 2012005634 A1 | 1/2012 | |
| WO | WO-2012005634 A1 * | 1/2012 | ............ B64D 15/20 |

OTHER PUBLICATIONS

International Search Report and Written Opinion for PCT/GB2014/050593 dated May 27, 2014 (10 pages).
Combined Search and Examination Report Under Sections 17 & 18(3) for GB1303612.4 dated Mar. 20, 2013 (2 pages).
UK Search Report for GB1303612.4 dated Mar. 19, 2013 (2 pages).
Notification Concerning Transmittal of International Preliminary Report on Patentability with Written Opinion for PCT/GB2014/050593 dated Sep. 11, 2015 (8 pages).

* cited by examiner

ICE PROTECTION SYSTEM

CROSS REFERENCE TO RELATED APPLICATIONS

This application is a national stage of, and claims priority to, Patent Cooperation Treaty Patent Application No. PCT/GB2014/050593, filed on Feb. 28, 2014, which claims priority to United Kingdom Application No. GB 1303612.4, filed Feb. 28, 2013, each of which applications are hereby incorporated herein by reference in their entireties.

BACKGROUND

For an aircraft, the in-flight formation of ice on the external surface of the aircraft is undesirable. The ice destroys the smooth flow of air over the aircraft surface, increases drag and decreases the ability of an aerofoil to perform its intended function.

Also, built-up ice may impede the movement of a movable control surface such as a wing slat or flap. Ice which has built up on an engine air inlet may be suddenly shed in large chunks which are ingested into the engine and cause damage.

It is therefore common for aircraft, and particularly commercial aircraft, to incorporate an ice protection system. A commercial aircraft may use a system which involves bleeding hot air off from the engines, and the hot air is then ducted to the airframe components such as the leading edges of the wing and the tail which are prone to ice formation. More recently, electrically powered systems have been proposed, such as in EP-A-1,757,519 (GKN Aerospace) which discloses a wing slat having a nose skin which incorporates an electro-thermal heater blanket or mat. The heater mat is bonded to the rear surface of a metallic erosion shield which comprises the forwardly-facing external surface of the nose skin.

The heater mat is of the SPRAYMAT® (trade mark) type and is a laminated product comprising dielectric layers made of preimpregnated glass fibre cloth and a heater element formed by flame spraying a metal layer onto one of the dielectric layers. The SPRAYMAT has a long history from its original development in the 1950s by D. Napier & Sons Limited (see their GB-833,675 relating to electrical de-icing or anti-icing apparatus for an aircraft) through to its subsequent use by GKN Aerospace.

Modern designs of heater mat are disclosed in GB-A-2,477,336 and GB-A-2,477,337 and GB-A-2,477,338 and GB-A-2,477,339 and GB-A-2,477,340 which are all in the name of GKN Aerospace.

In order to know when to initiate operation of a heater mat, an aircraft is currently provided with an ice-detection sensor which is remote from the location of the heater mat. For example, the ice-detection sensor may be incorporated into a stub-shaped probe which is mounted on the fuselage adjacent to the cockpit and which projects into the airstream.

The ice-detection sensor may be an optical sensor such as the forward-looking sensor which is described in WO-2004/110865 and which has a fibre optic light emitter at the centre of an array of fibre optic sensor elements (for example, a linear array of six sensor elements). Accreted ice causes the emitted light to be diffusely scattered and reflected back into the sensor elements, and the characteristics of the output signals from the sensor elements enable control electronics to determine the thickness of the accreted ice and the type of the accreted ice (e.g. glaze ice, rime ice, or mixed ice comprising glaze ice and rime ice).

The result of the ice detection is provided as advice or information to the pilot in the cockpit using a visual and/or audible annunciator, and the pilot makes a decision as to whether to activate the heater mats of the ice-protection system.

The probe which incorporates the optical ice sensor has an aerodynamic profile which is different to the aerodynamic profile of the airframe component in which the heater mat is incorporated. Also, the probe is remote from the airframe component. Thus icing of the airframe component has to be inferred from detected icing of the probe.

The pilot, based on the output of the probe, may activate the heater mats when de-icing of the airframe component is not needed (which would waste power by unnecessarily operating the heater mats) or may fail to activate the heater mats when the airframe component has accreted ice which is causing a problem although the output from the probe does not indicate to the pilot that there is an icing problem.

When the pilot does activate the heater mats (for example heater mats in the wing slats and in the leading edges of the tailplane and the tail fin and the engine nacelles) the heater mats are operated in a predetermined sequence involving all of the heater mats. This means that power may be wasted heating some parts of the wing slats, tailplane, tail fin and engine nacelles which do not currently need to be heated because the parts in question currently are not covered with accreted ice or with ice which is thick enough to merit de-icing. Power is wastefully used to heat these parts when it would be more efficiently used to heat only those parts which are covered with accreted ice of sufficient thickness to merit de-icing.

It would be desirable to provide an improved ice protection system and method of operation thereof.

SUMMARY

An ice protection system is suitable for use in an aircraft or other aerodynamic structure such as a blade of a wind turbine to perform a de-icing function by removing accreted ice. A method of operating an ice protection system is also disclosed herein.

An ice-protection system can comprise:
- a first de-icing apparatus operable to de-ice a first zone;
- a first ice-detection sensor positioned in the first zone and arranged to detect ice accreted on the first zone;
- a control system responsive to the first ice-detection sensor and arranged to control the operation of the first de-icing apparatus;
- second de-icing apparatus operable to de-ice a second zone; and
- a second ice-detection sensor positioned in the second zone and arranged to detect ice accreted on the second zone;
- wherein the control system is responsive to the second ice-detection sensor and is arranged to control the operation of the second de-icing apparatus.

Because the accretion of ice is detected locally of each zone, rather than being detected remotely, the control of the operation of the respective de-icing apparatus may be based on actual detected ice on the zone rather than inferring about the ice on the zone from a remote ice-detection probe.

For example, if each zone is a zone of a wing slat, the ice accretion is detected locally on the wing slat, rather than being detected remotely such as by a probe situated on the fuselage of the aircraft adjacent to the cockpit, where the icing conditions and the airflow may be different to those at the wing slat.

An aircraft has a limited generating capacity for electrical power, and the available power must be deployed where it is most needed and not used unnecessarily, because unnecessary use of electrical power will increase fuel consumption by the engines and thus increase the cost of operating the aircraft.

Each de-icing apparatus may be electro-mechanical such as inflatable pneumatic boots or an electroexpulsive system which uses rapid electromechanically induced vibrations. In the case of pneumatic boots, which are mounted externally so as to be exposed to the airstream, each zone of operation of the de-icing apparatus would be a zone corresponding to the area over which the pneumatic boots may be inflated to shed accreted ice.

Alternatively, each de-icing apparatus may be electro-thermal and may comprise one or more heater mats. For a heater mat which is fitted behind an erosion shield, each zone of operation of the de-icing apparatus is the front face of the erosion shield overlying the heater element(s) of the heater mat.

In an embodiment, each ice-detection sensor is arranged to detect the thickness of the ice accreted on the respective zone. The control system also can be arranged, when the detected thickness of the accreted ice on a zone has built up to a predetermined thickness, to operate the respective de-icing apparatus.

An electro-mechanical de-icing apparatus, such as pneumatic boots, normally requires a minimum thickness (or stiffness) of accreted ice before the ice can be fractured and shed effectively. By detecting the thickness of the ice which has accreted on a zone, the sensor enables the de-icing apparatus to be operated in an efficient manner. For example, power is not wasted in de-icing the zone before the accreted ice is thick enough (has reached the predetermined or minimum thickness) to be shed effectively.

Measuring the thickness of the accreted ice may also enable an electro-thermal de-icing apparatus to operate efficiently. For example, when a zone is on an aerofoil, it is beneficial to initiate the shedding of the accreted ice when it has reached a predetermined or minimum thickness at which the accreted ice experiences sufficient aerodynamic load from the airflow for the ice to be shed from the aerofoil in a clean manner. The predetermined thickness may be set such that, when the ice is thinner than the predetermined thickness, the ice does not affect the handling qualities of the aircraft to a significant or detrimental extent.

The predetermined thickness may be about 0.5 mm, 1 mm, 1.5 mm, 2 mm, 2.5 mm, 3 mm, 3.5 mm, 4 mm, 4.5 mm or 5 mm. An exemplary value is about 2 mm.

In an embodiment, each ice-detection sensor is arranged to detect the type of ice that is accreted on the respective zone. Preferably, the control system is responsive to the detected ice type to vary a predetermined thickness needed to trigger operation of the respective de-icing apparatus.

For example, when the accreted ice is rime ice, which is friable because of internal bubbles and cracks, it may be possible to set the predetermined thickness to be thicker than when the accreted ice is glaze ice, which firmly adheres to a surface and which would benefit from an earlier initiation of ice shedding to overcome the high level of adhesion.

In an embodiment, each zone is a zone of a leading edge of an aerodynamic or streamlined component, such as an airframe component. For example, the airframe component may be (a forward portion of) an aerofoil or an engine nacelle.

In an embodiment, the leading edge has a window in each zone; and a sensor head of the respective ice-detection sensor is positioned behind the window. For example, the window may be provided in the leading edge of the erosion shield of a wing slat.

In an embodiment, the window is aero-conformal with the adjacent part of the leading edge of the airframe component. When the airframe component is an aerofoil, the window is flush with the surrounding part of the aerofoil so as not to disrupt the airflow around the leading edge. For example, when the window has been formed in a metallic erosion shield, the window may replicate the shape of the metal which has been removed in order to form the window aperture.

In an embodiment, each ice-detection sensor is an optical sensor and is preferably of the type which has a sensor head comprising a central light emitter and a plurality of sensor elements positioned peripherally of the central light emitter. For example, the sensor elements may form a linear array, or a cross-shaped array with the light emitter at the centre of the cross. A linear array is preferred because is enables the sensor head to be more compact and to have an elongate front face with the sensor element array aligned generally longitudinally of the front face.

In an embodiment, a sensor head is elongate and has a longitudinal axis which is generally aligned along or is generally parallel to a longitudinal axis of the leading edge of an airframe component. For an optical sensor, this configuration enables a linear array of sensor elements to remain in the same plane as the light emitter and to face a front face of the window (e.g. the front face of a transparent block which forms the window) which is generally parallel to the sensor elements. If the sensor head were to be perpendicular to the longitudinal axis of the leading edge, the linear array of sensor elements would face a front face of the window which is convex (in order to conform to the convex shape of the leading edge) and this might complicate the characteristics of the reflections at the window/air or window/ice interface.

In an embodiment, each ice-detection sensor is positioned in a central portion of the respective zone. This can enable one sensor per zone to provide information about the accreted ice which is likely to be representative of all of the accreted ice on the zone. A sensor which is positioned at one side of the zone might provide information which is less representative of the accreted ice at the opposite side of the zone.

In an embodiment, each zone includes a plurality of said ice-detection sensors positioned in respective sub-zones of the zone. Preferably, the control system is responsive to said plurality of ice-detection sensors and is arranged to select one of a plurality of operation modes of the respective de-icing apparatus.

Using a plurality of sensors per zone helps to improve the accuracy of the monitoring of the ice accretion across the zone. The selected operation mode may be one which optimises the de-icing treatment of the zone. For example, if a particular ice-detection sensor indicates that a particular sub-zone has more accreted ice than the other sub-zone(s), the de-icing operation may be performed on the sub-zone in question and not on the other sub-zone(s).

The number of zones may be multiplied to suit, for example, the number of zones on an aircraft which need to be protected against dangerous ice accretion.

In an embodiment, the ice-protection system further comprises: 3rd to nth de-icing apparatuses operable to de-ice respective 3rd to nth zones; and 3rd to nth ice-detection sensors each positioned respectively in the 3rd to nth zones and arranged to detect ice accreted on the respective zone;

wherein the control system is responsive to the ice-detection sensors and is arranged to control operation of the de-icing apparatuses.

The control system may prioritise a particular zone which has the thickest accreted ice, the accreted ice which is increasing in thickness at the fastest rate, and/or the accreted ice of a priority type for treatment.

In an embodiment, the control system stores a library of sequences of operation of the de-icing apparatuses and is arranged to select a sequence based on the pattern or characteristics (such as some or all of the characteristics mentioned in the previous paragraph) of detected ice on the zones.

For example, if there are eight wing slats and the leading edge of each wing slat is a zone, such that there are eight zones, and if accreted ice is more of a problem on the left wing compared with the right wing, the control system may select a de-icing sequence which de-ices the left wing before starting to de-ice the right wing.

The control system may try to arrange for de-icing of the two wings to be completed at substantially the same time in spite of the different starting conditions of the accreted ice on the two wings.

In an embodiment, the control system is arranged to select a sequence of operation which starts with the zone with the first detected accretion of ice.

In a different embodiment, the control system is arranged to select a sequence of operation which starts with the zone with the thickest detected accretion of ice (e.g. glazed ice).

In an embodiment, the control system is arranged, when one or more zones have no detected accreted ice or accreted ice which is below a predetermined thickness, to select a sequence of operation which omits said one or more zones or de-ices said one or more zones at the end of the sequence of operation.

In an embodiment, each each heater mat has a plurality of independently-operable heater areas each corresponding to a respective sub-zone of the zone of de-icing operation of the heater mat.

In order to ensure good control of the de-icing function of the heater mat, each heater area can include a respective ice-detection sensor. Each heater area may comprise one or more heater elements.

In an embodiment, each heater mat is elongate in a longitudinal direction and is curved transversely of the longitudinal direction to define a convex forward face of the heater mat and a concave rearward face of the heater mat. Each heater mat can include one or more sensor apertures each containing a sensor head of the ice-detection sensor or a respective one of the ice-detection sensors associated with the heater mat.

In an embodiment, one or more sensor apertures of a heater mat are positioned on a leading edge of the heater mat, such as in a row along the leading edge. Alternatively or additionally, one or more sensor apertures may be positioned behind (e.g., above and/or below) the leading edge in trailing portions of the heater mat which are behind the leading edge.

In an embodiment, the control system of the ice-protection system is arranged to activate automatically a sequence of operation of the de-icing apparatuses in response to the ice-detection sensors without requiring manual activation. This "primary" or automatic control of the de-icing operation removes the need for a pilot to monitor, assess and respond to cockpit annunciations of ice presence, thickness and type.

In an embodiment, each de-icing apparatus is in the form of a panel (e.g. a panel comprising one or more heater mats). One or more ice-detection sensors may be integrated into the panel. This may be done by providing the or each sensor in the form of a module, and by integrating the sensor module(s) with the panel. For example, sensor head(s) of the module(s) may be integrated with (e.g. embedded in) the panel, and sensor body(ies) of the module(s) may be positioned behind a rear surface of the panel. If the panel is curved so as to have a convex front surface and a concave rear surface, the sensor head(s) and preferably also the sensor body(ies) may be positioned protectively within the concavity of the rear surface of the panel. The boundary of the panel (e.g. a generally rectangular boundary) may be considered as defining the boundary of the respective (overlying) de-icing zone.

A method of operating an ice-protection system, can comprise the steps of:

positioning first and second de-icing apparatuses and first and second ice-detection sensors in respective first and second zones;

detecting ice accreted on a zone by using the respective ice-detection sensor; and in response to detection of accreted ice on a zone, de-icing the zone by using the respective de-icing apparatus.

Preferred features of the first aspect of the disclosed system are applicable, mutatis mutandis, to the disclosed method.

BRIEF DESCRIPTION OF THE DRAWINGS

Specific embodiments will now be described, by way of example only, with reference to the accompanying drawings in which.

While the subject matter disclosed and/or claimed herein is susceptible to various modifications and alternative forms, specific embodiments are shown by way of example in the drawings and are herein described in detail. It should be understood, however, that the drawings and detailed description of the specific embodiments are not intended to limit the invention to the particular forms disclosed. On the contrary, the invention covers all modifications, equivalents and alternatives falling within the spirit and the scope of the present invention as defined by the appended claims.

DETAILED DESCRIPTION OF EXAMPLE EMBODIMENTS

Figure 1:
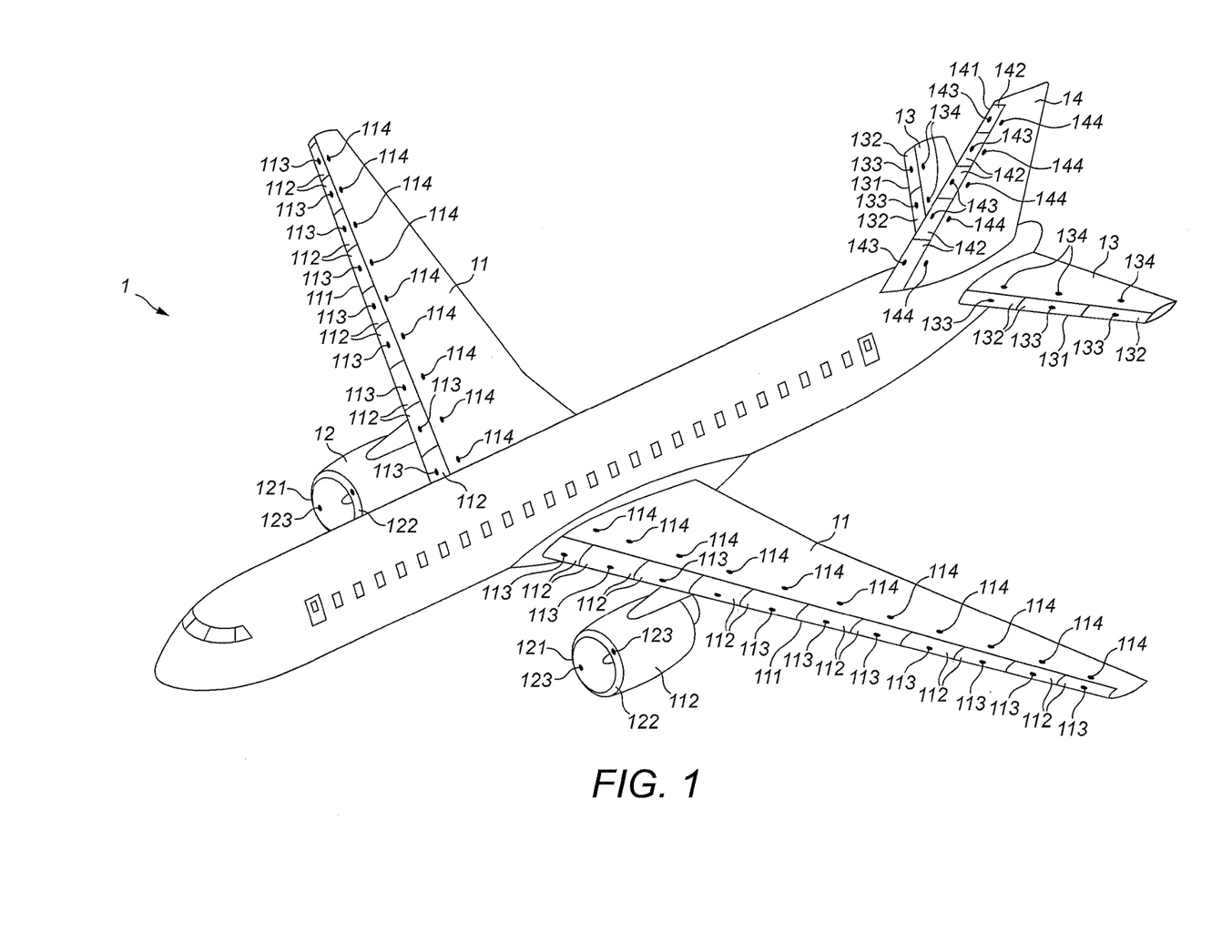
FIG. 1 is a diagrammatic perspective view of an aircraft incorporating an ice-protection system.

FIG. 1 is a diagrammatic perspective view of an aircraft 1 incorporating an ice-protection system. The aircraft 1 incorporates the ice-protection system in its wings 11, engine nacelles 12, tail planes 13 and tail fin 14.

Each wing 11 has a leading edge 111 which is split into ice-protections zones 112. Each zone 112 contains an electro-thermal heater mat. Individually or as groups, the zones 112 may correspond to wing slats. Each zone 112 is shown as having an embedded or integral sensor head 113 of an ice-detection sensor. Behind the zones 112, there are sensor heads 114 of supplemental (optional) ice-detection sensors. The sensor heads 113, 114 are aero-conformal in the sense of being flush with the adjacent wing surface.

Each engine nacelle 12 has a leading edge 121 which comprises an annular ice-protection zone 122 containing one or more heater mats. Each zone 122 has embedded or integral sensor heads 123 of ice-detection sensors. The sensor heads 123 are aero-conformal with the adjacent surface of the engine nacelle.

Each tail plane 13 has a leading edge 131 which is split into ice-protection zones 132. Each zone 132 contains a heater mat and an embedded or integral sensor head 133 of an ice-detection sensor, and behind each zone is a sensor head 134 of a supplemental (optional) ice-detection sensor. The sensor heads 133, 134 are aero-conformal with the adjacent surface of the tail plane 13.

The tail fin 14 has a leading edge 141 which is split into ice-protection zones 142. Each zone 142 contains a heater mat and an embedded or integral sensor head 143 of an ice-detection sensor. Behind each zone 143 is a sensor head 144 of a supplemental (optional) ice-detection sensor. The sensor heads 143, 144 are aero-conformal with the adjacent surface of the tail fin 14.

The sensor heads 113, 114, 123, 133, 134, 143, 144 are elongate and are generally aligned with or parallel to their respective leading edges 111, 121, 131, 141.

In the following Figures, much of the discussion is in the context of an aircraft wing, but the discussion is also applicable to the other airframe components, and to aerofoils in general.

Figure 2:
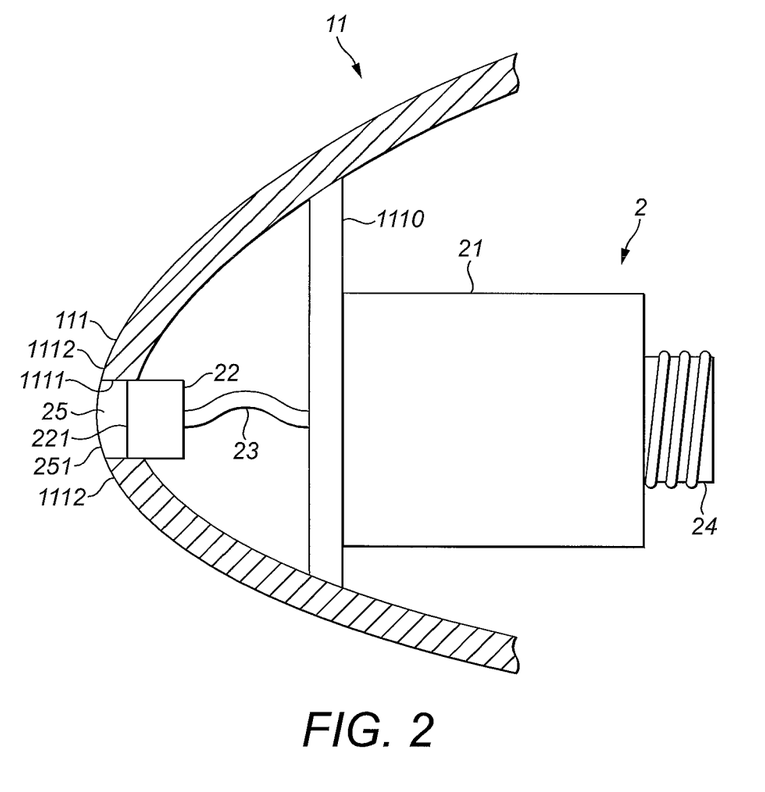
FIG. 2 is a diagrammatic sectional view through a leading edge of an aerofoil showing an ice-detection sensor of an ice-protection system.

FIG. 2 is a diagrammatic sectional view through a leading edge of an aerofoil such as the leading edge 111 of the wing 11 and shows an ice-detection sensor 2 of an ice-protection system. The sensor 2 comprises a sensor body 21 which is connected to a sensor head 22 (sensor head 113 of FIG. 1) by a cable 23. A connector 24 is provided for connecting the sensor body 21 to a control system. An internal structural support 1110 of the leading edge 111 supports the sensor body 21.

The sensor head 22 is forward facing and is received in a window aperture 1111 of the leading edge 111. A front face 221 of the sensor head 22 is covered by a transparent window 25 which is received in the window aperture 1111 and has a front face 251 which is convex and is flush with the adjacent surfaces 1112 of the leading edge 111 so that the window 25 is aero-conformal with the leading edge 111.

The sensor 2 is an optical sensor and is of the fibre-optic type, such as is shown in WO-2004/110865. The general mode of operation of this type of sensor is diagrammatically illustrated in the perspective view of FIG. 3 which shows accreted ice 3 on the leading edge 111 of the wing 11.

Figure 3:
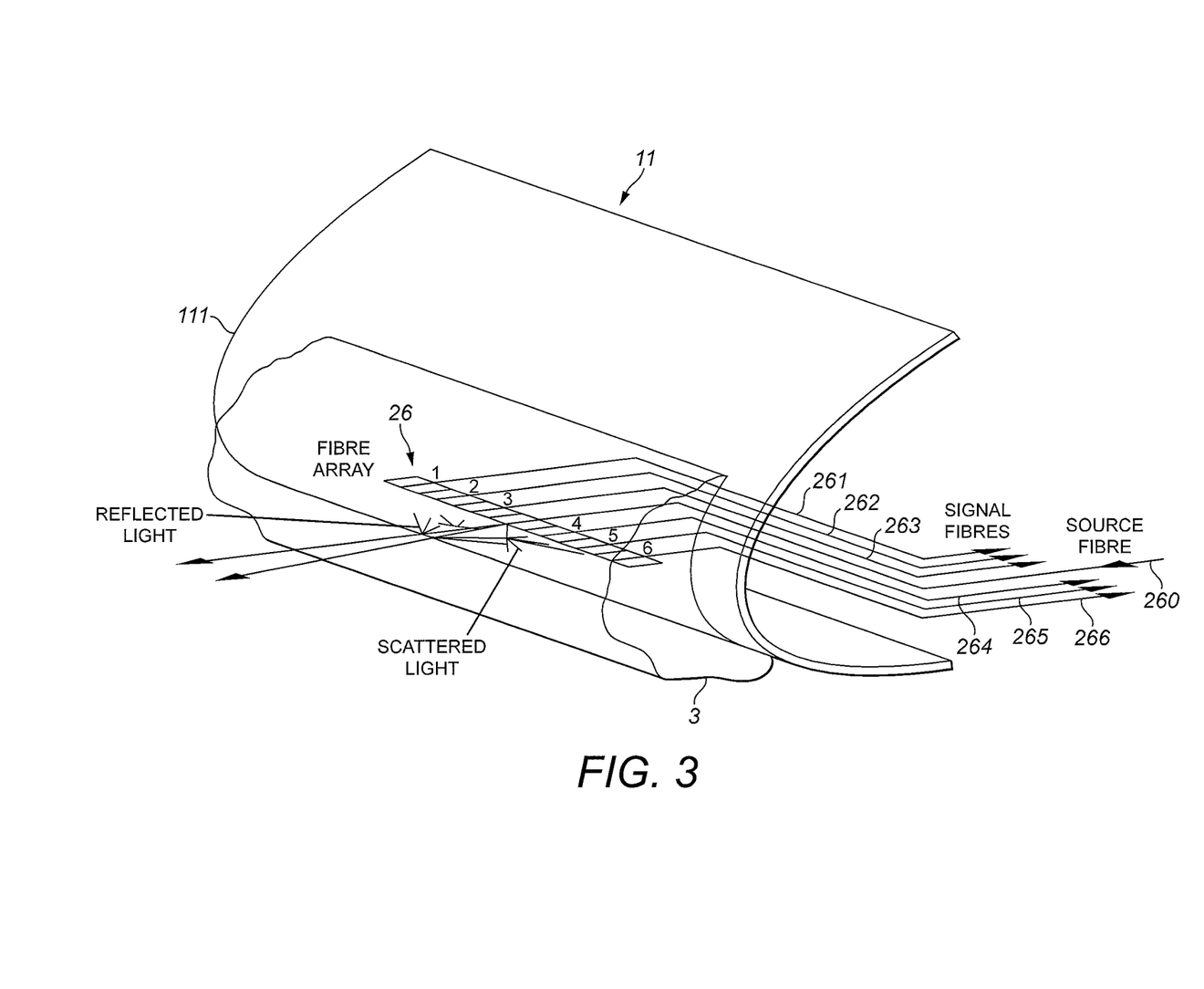
FIG. 3 is a diagrammatic perspective view illustrating the mode of operation of the ice-detection sensor of FIG. 2.

FIG. 3 is simplified relative to FIG. 2 and, for example, does not show the window 25 or the window aperture 1111. Instead, FIG. 3 shows a linear fibre array 26 which is positioned in the front face 221 (see FIG. 2) of the sensor head 22 and which comprises a central light source fibre 260 (a central emitter of laser light) positioned at the centre of six signal detector fibres 261-266 (sensor elements). The light which is emitted from the light source fibre 260 is reflected and scattered by the ice 3 and is diffusely received in the signal detector fibres 261-266. The characteristics of the signals produced by the fibres 261-266 vary with the thickness and the type of the accreted ice 3, as generally described in WO-2004/110865.

A light source (a laser) and the fibres 260 and 261-266 are contained within the sensor head 22 of FIG. 2. A photodiode array receives optical signals from the six signal fibres 261-266 and the resulting electrical signals are fed via the cable 23 (see FIG. 2) to the sensor body 21 (see FIG. 2) which functions as a data acquisition unit to process the electrical signals. The cable 23 also serves to pass power to the laser in the sensor head 22.

The processed electrical signals may then be passed from the sensor body 21 (the data acquisition unit) via the connector 24 (see FIG. 2) to a control system for controlling a de-icing apparatus (e.g. an electro-thermal heater mat) which is positioned behind the leading edge 111 and in which the sensor array 26 is embedded.

The control system may modulate the power delivered to the heater mat. For example, if no accreted ice is present, the heater mat may remain switched off. If accreted ice is present, based on the local detection by the sensor array 26, the heater mat may be switched on. The power level may be modulated based on the detected ice thickness and ice type. The modulation may also take into account the rate of ice accretion and the priority level of de-icing the zone of the leading edge 111 which overlies the heater mat relative to the de-icing requirements of other zones.

Figure 4A:
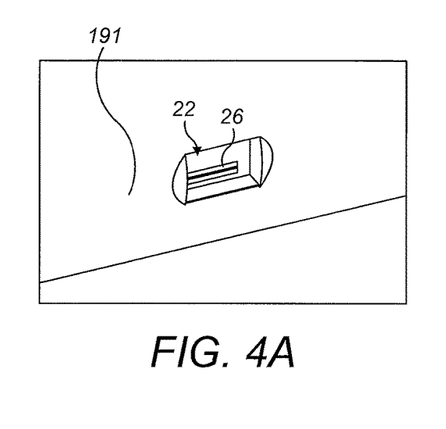
FIGS. 4A, 4B, and 4C each provide a view of a prototype ice-detection sensor for use in an ice-protection system.
Figure 4B:
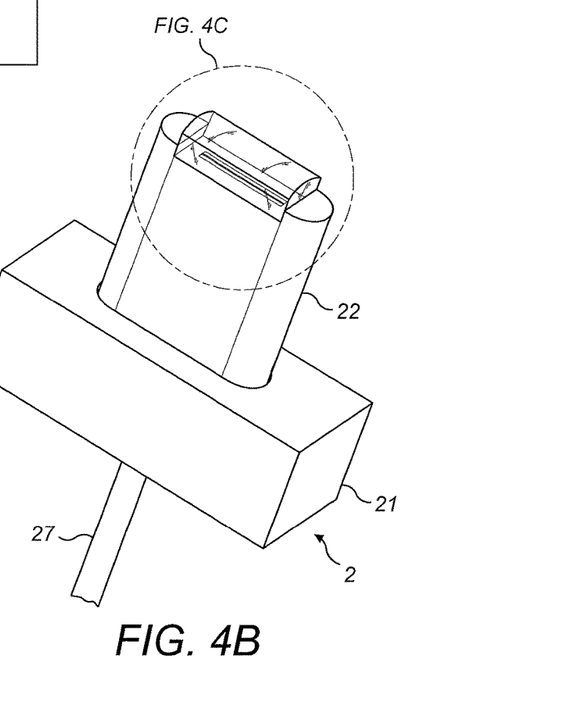
Figure 4C:
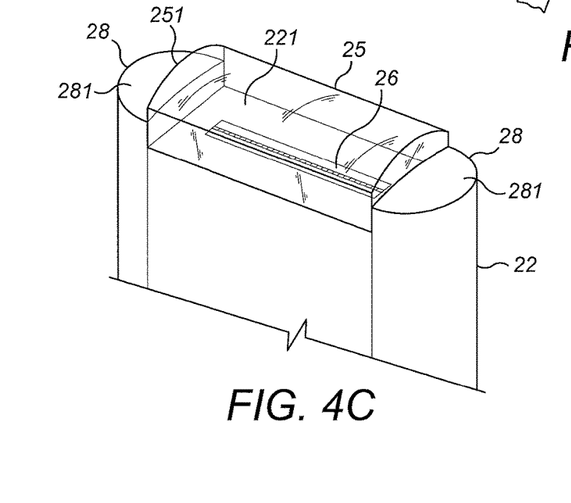

FIGS. 4A-4C are views of a prototype ice-detection sensor 2 which we have recently developed. From FIG. 4B, it may be seen that the sensor 2 is modular in that the sensor body 21 and the sensor head 22 are integral and form a module. Because the body and head are integral, the prototype sensor 2 of FIGS. 4A-4C does not need the external cable 23 of FIG. 2. The sensor head 22 projects forwards from a front face of the sensor body 21 and has a smaller transverse cross-section than the sensor body 21 in order to assist in fitting the sensor head 22 into the inside of a leading edge of an aerofoil.

A cable 27 extends from a rear face of the sensor body 21 (equivalent to extending back from the connector 24 of FIG. 2) in order to connect the sensor 2 to a control system of the ice-protection system.

FIG. 4A shows the sensor head 22 installed in the leading edge 191 of an erosion shield of a rotor blade. The sensor head 22 is aero-conformal because a shaped sapphire glass window 25 (see FIG. 4C) is positioned in front of the flat front face 221 of the sensor head 22 and the fibre array 26 which is contained in the front face 221.

With the prototype of FIGS. 4A-4C, the front face 221 of the sensor head 22 is recessed relative to two forwardly-projecting abutments 28 which are positioned at the ends of the elongate window 25 and which have front faces 281 which project forwards slightly less than the window 25. The window 25 may project beyond the front faces 281 by the thickness of the erosion shield, so that the front faces 281 abut against the rear face of the erosion shield and help to correctly position the sensor head 22 relative to the erosion shield to ensure that the front face 251 of the window 25 is aero-conformal.

Figure 5:
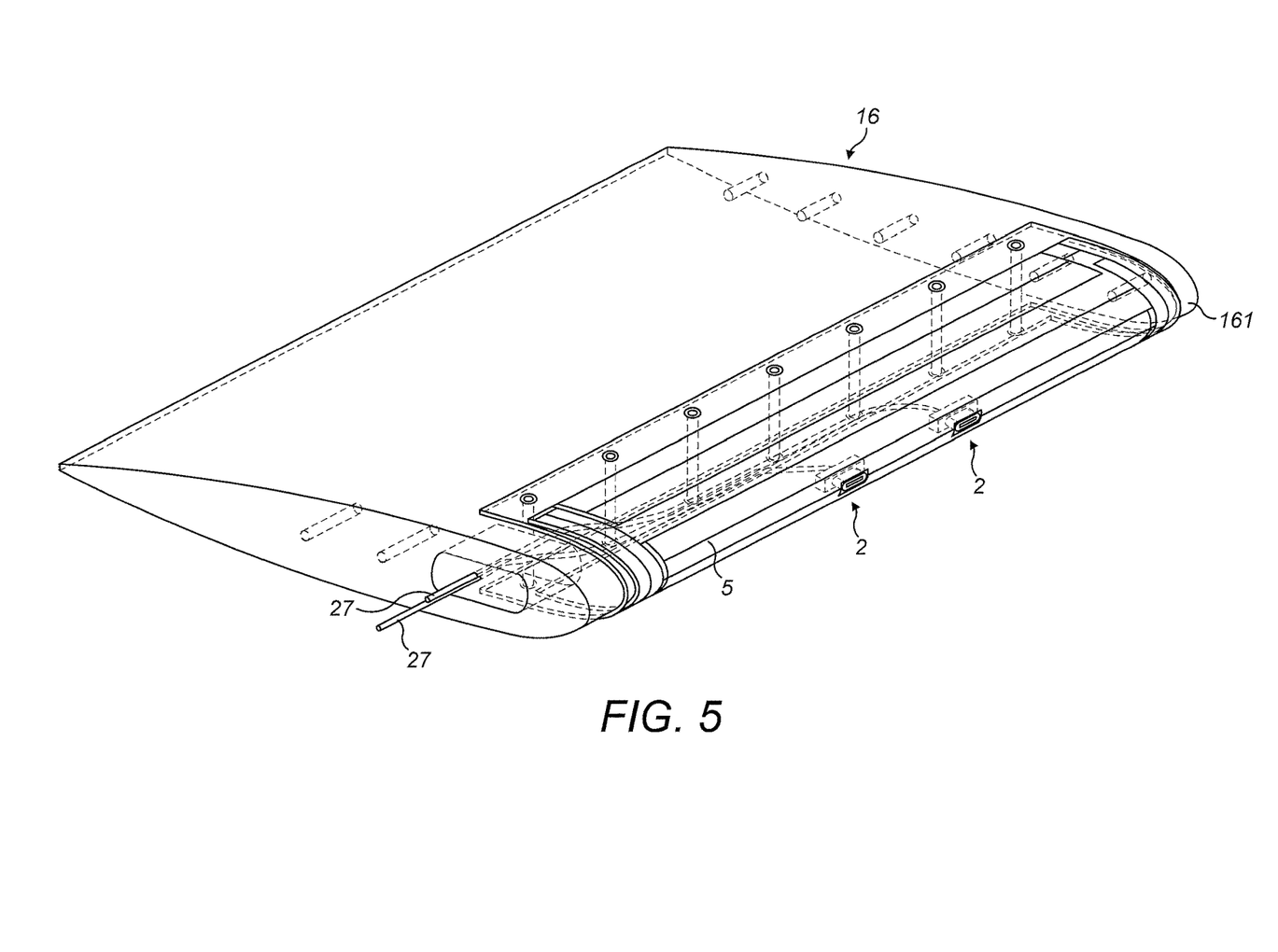
FIG. 5 is a perspective view of an experimental aerofoil incorporating ice-detection sensors of an ice-protection system.

FIG. 5 is a perspective view of an experimental aerofoil 16 incorporating two ice-detection sensors 2 of the general type shown in FIGS. 4A-4C. The aerofoil 16 has a leading edge 161 and inside the skin of the aerofoil is an electro-thermal heater mat 5 which is fixed to the inside of the erosion shield at the leading edge 161.

The area of the erosion shield which overlies the heater mat 5 forms an ice-protection zone of the aerofoil 16.

Figure 6:
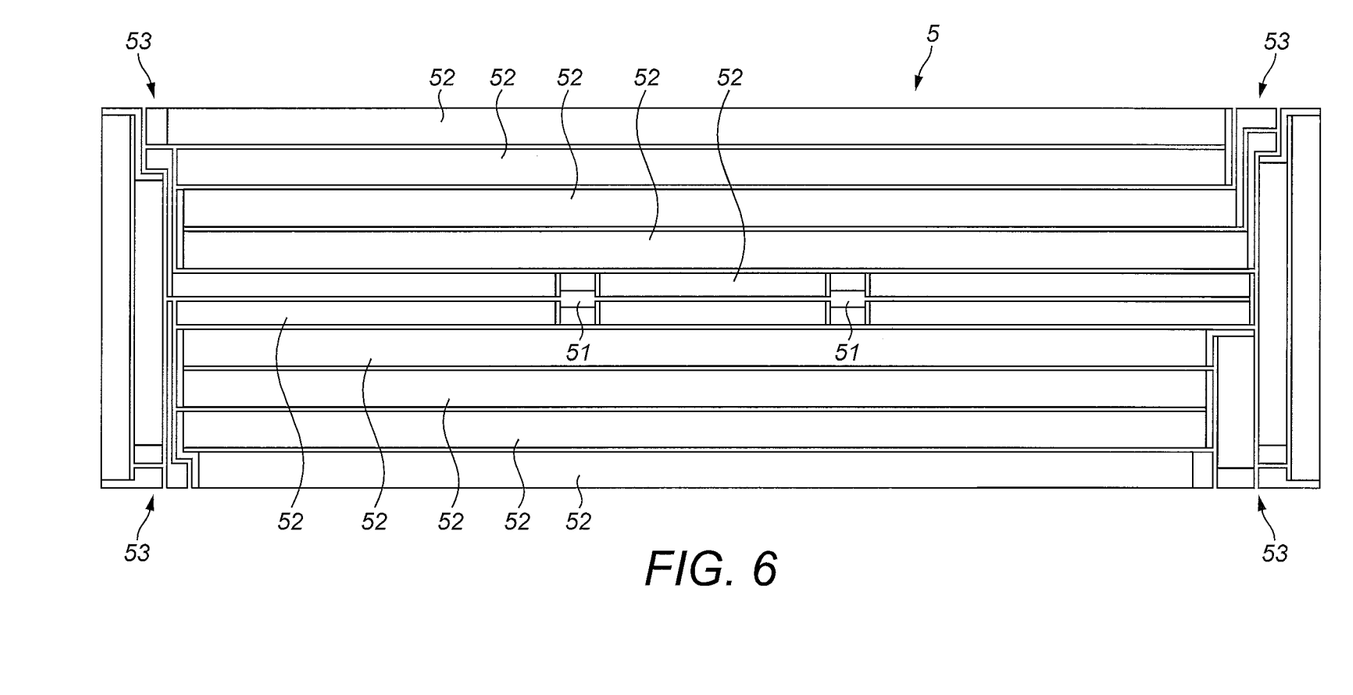
FIG. 6 is a developed (flat) view of a curved heater mat used in the experimental aerofoil of FIG. 5.

FIG. 6 is a developed (flat) view of the heater mat 5. The heater mat 5 is generally rectangular and thus the ice-protection zone is also generally rectangular. The heater mat 5 has two central sensor apertures 51 which are positioned on the longitudinal axis of the heater mat 5 so as to be located along the leading edge 161 when the heater mat 5 is installed in the aerofoil 16. Each sensor aperture 51 receives a sensor head 22 of a sensor 2.

It can be seen from FIG. 6 that providing the sensor apertures 51 involves only a small reduction in the size of the heating elements 52 of the heater mat.

Electrical connectors 53 are provided at the ends of the heating elements 52 to enable the heating elements to be powered. The heating elements 52 are grouped into two groups (two "sub-zones" of the overall ice-protection zone of the heater mat 5) and each sub-zone is controlled by a respective one of the two sensors 2.

When the heater mat 5 is installed (see FIG. 5) it is curved transversely of the longitudinal direction of the elongate heater mat and has a convex front face which conforms to and abuts the concave rear face of the erosion shield at the leading edge 161 of the aerofoil 16.

The two sensors 2 are installed after the heater mat 5 has been installed in the aerofoil 16, and the two cables 27 of the sensors 2 lead away to a control system which modulates the power supplied to the sub-zones of the heater mat 5.

Figure 7:
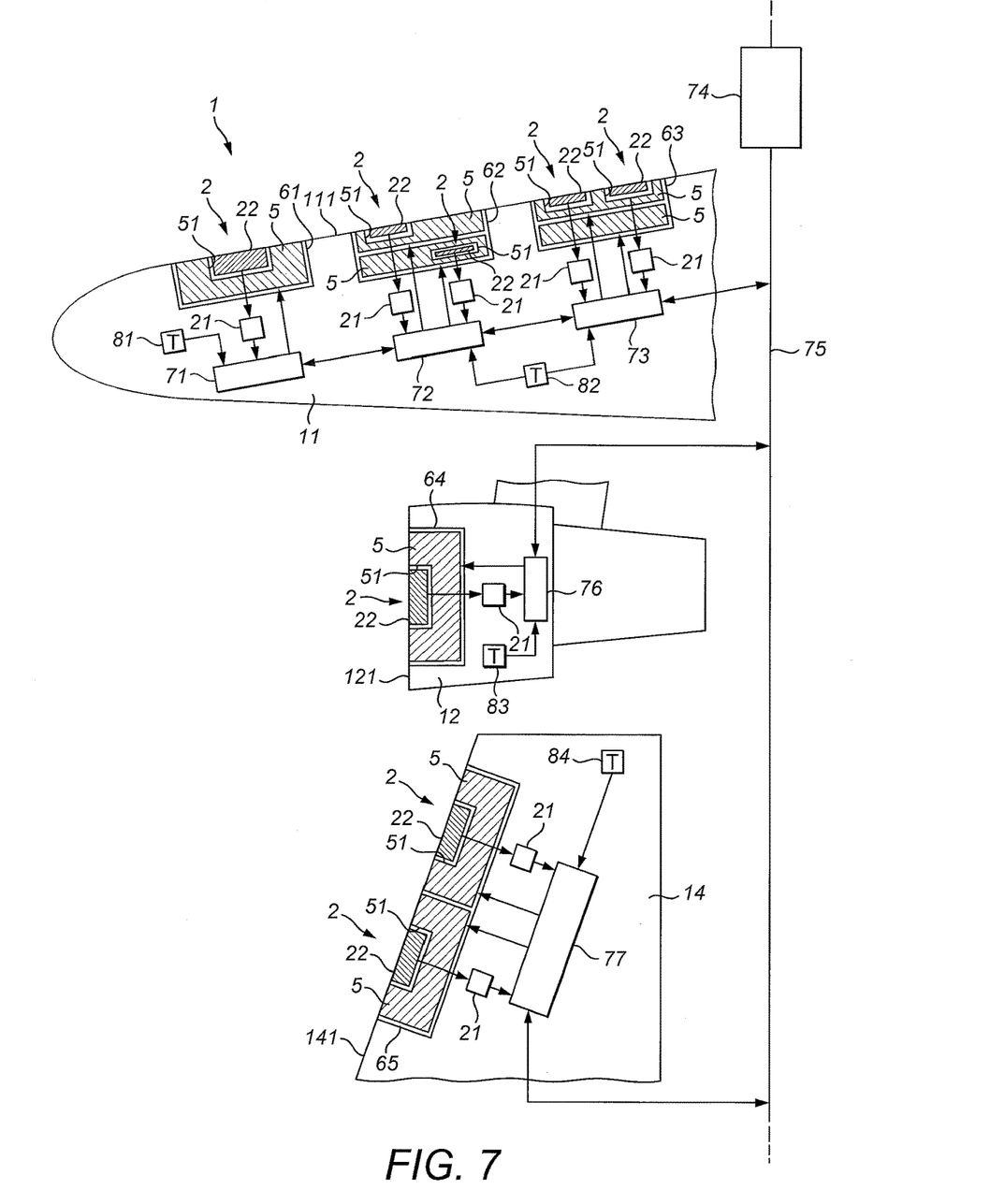
FIG. 7 is a schematic view of an ice-protection system incorporated in selected airframe components (wing, engine nacelle and tail fin) of an aeroplane.

FIG. 7 is a schematic view of an ice-protection system of the present invention incorporated in selected airframe components (wing 11, engine nacelle 12 and tail fin 14) of an aeroplane 1.

In the wing 11, there are three ice-protection zones 61, 62, 63 along the leading edge 111 of the wing 11. Each zone 61, 62, 63 corresponds to a wing slat.

The zone 61 contains one heater mat 5 and one integral sensor 2. The sensor 2 is connected to a controller 71.

The zone 62 contains two heater mats 5 and two integral sensors 2, and each heater mat 5 acts as a sub-zone of the zone 62 and contains one of the sensors 2. The two sensors 2 are connected to a controller 72. One of the heater mats 5 is set back from the leading edge 111 and is generally parallel to the heater mat 5 which is positioned along the leading edge 111.

The zone 63 contains two heater mats 5 and two integral sensors 2. Each heater mat 5 acts as a sub-zone of the zone 63 and the forwardmost heater mat along the leading edge 111 contains both of the sensors 2. The rearmost heater mat 5 does not contain a sensor, but is controlled by the output of the two sensors 2, which are connected to a controller 73.

Temperature sensors 81, 82 may be included in the wing 11 in order to provide additional information to the controllers 71, 72, 73.

The controllers 71, 72, 73 are interconnected and connect to a main controller 74 of the aircraft via a main control bus 75.

In the engine nacelle 12, the leading edge 121 has an ice-protection zone 64 which contains a heater mat 5 and one integral sensor 2 which is connected to a controller 76 which, in turn, is connected to the control bus 75. A temperature sensor 83 may also be connected to the controller 76.

In the tail fin 14, the leading edge 141 has an ice-protection zone 65 containing two heater mats 5 each having one integral sensor 2. The sensors 2 are connected to a controller 77 which, in turn, is connected to the control bus 75. A temperature sensor 84 may also be connected to the controller 77 to provide extra information to assist with the control of the heater mats.

The controllers 71, 72, 73 in the wing 11 and the controller 76 in the engine nacelle 12 and the controller 77 in the tail fin 14 act together to form a distributed control system for controlling the de-icing operation of the heater mats 5 of the zones 61-65.

These controllers may also interact with the main aircraft controller 74. For example, if the controllers 71-73, 76, 77 are set up to perform an automatic or primary de-icing function, then the status of the operation of the de-icing function may be notified to the pilot in the cockpit via the control bus 75 and the main controller 74.

Each zone 61-65 has local detection of accreted ice on the zone itself by means of one or more integral ice-detection sensors 2. The control system (controllers 71-73, 76, 77) can thus have accurate information about the actual state of ice accretion on the various leading edges 111, 121, 141.

Previously, the usual practice was to implement a standard sequence of de-icing operation of the zones based on information from a remote ice-detection sensor which required the state of ice accretion on the zones to be inferred from the remote sensor. For example, the remote ice-detection sensor might have been located adjacent to the cockpit.

With the embodiment of the ice-protection system as shown in FIG. 7, the control system can customise the sequence of de-icing of the zones 61-65 by modulating the power delivered to the various heater mats 5.

For example, if only the tail fin 14 currently has accreted ice which is of a sufficient thickness and type to need to be shed from the tail fin, then the control system may choose a sequence of operation or mode of operation of all of the heater mats 5 of the wing, engine nacelle and tail fin which involves first switching on (or only switching on) the two heater mats 5 of the zone 65 of the tail fin 14. The amount of power supplied to the two heater mats 5 of the tail fin 14 may be modulated to suit the accreted ice detected on the tail fin 14.

The control system may store a library of different sequences of operation of the heater mats 5 of the zones 61-65 and choose one based on the ice accretion information received from the sensors 2 of the zones 61-65.

Figure 8:
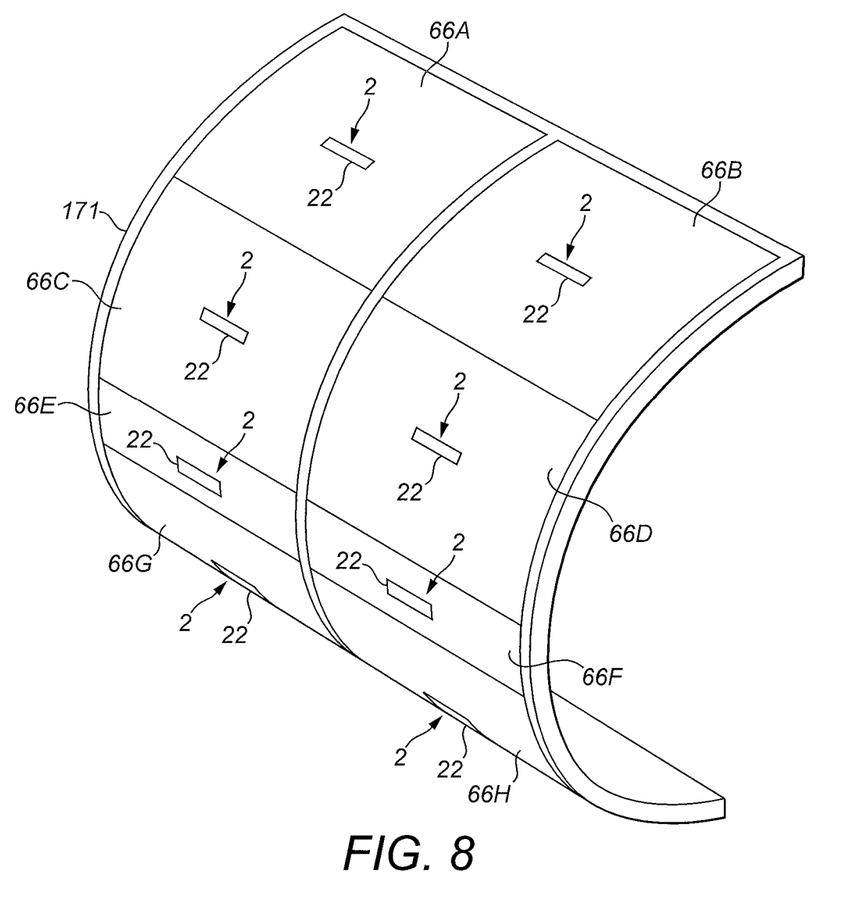
FIG. 8 is a diagrammatic perspective view of an aerofoil leading edge which is part of an ice-protection system and which has multiple ice-protected zones each having an embedded ice-detection sensor.

FIG. 8 is a diagrammatic perspective view of an aerofoil leading edge 171 which is part of an ice-protection system in accordance with the present invention and which has multiple ice-protected zones 66A-66H each having an embedded ice-detection sensor 2.

There have been described embodiments of an ice-protection system comprising first de-icing apparatus 5 operable to de-ice a first zone 61; a first ice-detection sensor 2 positioned in the first zone 61 and arranged to detect ice accreted on the first zone 61; and a control system 71 responsive to the first ice-detection sensor 2 and arranged to control the operation of the first de-icing apparatus 5.

There have also been described embodiments of a method of operating an ice-protection system, comprising the steps of positioning a first de-icing apparatus 5 and a first ice-detection sensor 2 in a first zone 61; detecting ice accreted on the first zone 61 by using the first ice-detection sensor 2;

and in response to detection of accreted ice on the first zone 61, de-icing the first zone 61 by using the first de-icing apparatus 5.

The invention claimed is:
1. An ice-protection system comprising:
first and second zones, wherein each of the zones is a zone of a leading edge of an aerodynamic or streamlined airframe component, each zone including a window;
a first de-icing apparatus operable to de-ice the first zone;
a first ice-detection sensor positioned in the first zone and configured to detect ice accreted on the first zone;
a control system responsive to the first ice-detection sensor and configured to control the operation of the first de-icing apparatus;
a second de-icing apparatus operable to de-ice the second zone; and
a second ice-detection sensor positioned in the second zone and configured to detect ice accreted on the second zone;
wherein the control system is responsive to the second ice-detection sensor and is configured to control the operation of the second de-icing apparatus;
wherein a sensor head of each respective ice-detection sensor is positioned behind the window in each respective zone,
each respective ice-detection sensor is in a form of a sensor module including the respective sensor head,
each window is elongated, having longitudinal ends in a longitudinal direction,
each window is elongated, having longitudinal ends in a longitudinal direction,
each respective sensor head having a front face and a first abutment and a second abutment, each abutment positioned at a respective one of the longitudinal ends of the window and terminating prior to a front face of the window,
each sensor module positioned behind the respective window of the respective zone such that the respective sensor head front face is covered by the respective window, and
the window front face in each respective zone is convex so as to be aero-conformal with an adjacent part of the leading edge of the airframe component.

2. The ice-protection system of claim 1, wherein the airframe component is one of a forward portion of an aerofoil and a wing slat.

3. The ice-protection system of claim 1, wherein the respective sensor head of each ice-detection sensor comprises a central light emitter and a plurality of sensor elements positioned peripherally of the central light emitter.

4. The ice-protection system of claim 3, wherein the sensor head is elongate and has a longitudinal axis which is aligned along or is parallel to a longitudinal axis of a leading edge of the airframe component.

5. The ice-protection system of claim 1, wherein each ice-detection sensor is positioned in a central portion of the respective zone.

6. The ice-protection system of claim 1, wherein:
each of the ice-detection sensors is further configured to detect a rate of accretion of ice and a type of accreted ice, and the control system is configured to store a library of sequences of operation of the de-icing apparatuses and is configured to select a sequence from the library of sequences based on at least one of a thickness of accreted ice, a rate of accretion of ice, and a type of accreted ice-detected on the zones.

7. The ice-protection system of claim 1, wherein:
the control system is configured to do one of select a sequence of operation which starts with the zone with the first detected accretion of ice and select a sequence of operation which starts with the zone with the thickest detected accretion of ice.

8. The ice-protection system of claim 1, wherein:
the control system is configured, when one or more zones have no detected accreted ice or accreted ice which is below a predetermined thickness, to select a sequence of operation which omits said one or more zones or de-ices said one or more zones at the end of the sequence of operation.

9. The ice-protection system of claim 1, wherein each de-icing apparatus comprises an electro-thermal heater mat.

10. The ice-protection system of claim 9, wherein each heater mat has a plurality of independently-operable heater areas each corresponding to a respective sub-zone of the zone of de-icing operation of the heater mat.

11. The ice-protection system of claim 10, wherein each heater area includes a respective ice-detection sensor that is one of the first ice-detection sensor, the second ice-detection sensor, or a third ice detection sensor.

12. The ice-protection system of claim 10, wherein each of the heater areas comprises one or more respective heater elements.

13. The ice-protection system of claim 9, wherein:
each heater mat is elongate in a longitudinal direction and is curved transversely of the longitudinal direction to define a convex forward face of the heater mat and a concave rearward face of the heater mat; and
each heater mat includes one or more sensor apertures each containing a sensor head of an ice-detection sensor that is one of the first ice-detection sensor, the second ice-detection sensor, or a third ice detection sensor and that is associated with the heater mat.

14. The ice-protection system of claim 13, wherein:
the one or more sensor apertures of each heater mat are positioned on a leading edge of the heater mat.

15. The ice-protection system of claim 13, wherein:
the one or more sensor apertures of each heater mat are positioned on trailing portions of the respective heater mat behind a leading edge of the respective heater mat.

16. The ice-protection system of claim 13, wherein:
the one or more sensor apertures of each heater mat are positioned in a row along a leading edge of the respective heater mat and are also positioned above or below the leading edge of the respective heater mat.

17. The ice-protection system of claim 1, wherein:
each ice-detection sensor is configured to detect a thickness of the ice accreted on the respective zone;
the control system is configured, when the detected thickness of the accreted ice on a zone has built up to a predetermined thickness, to operate the respective de-icing apparatus.

18. The ice-protection system of claim 17, wherein:
each ice-detection sensor is also configured to detect a type of ice that is accreted on the respective zone; and
the control system is responsive to the detected ice type to vary the predetermined thickness needed to trigger operation of the respective de-icing apparatus.

19. An aircraft comprising an ice-protection system, the ice protection system comprising:
first and second zones, wherein each of the zones is a zone of a leading edge of an airframe component that is at least one of aerodynamic and streamlined, each zone including a window;

a first de-icing apparatus operable to de-ice the first zone;
a first ice-detection sensor positioned in the first zone and configured to detect ice accreted on the first zone;
a control system responsive to the first ice-detection sensor and configured to control the operation of the first de-icing apparatus;
a second de-icing apparatus operable to de-ice the second zone; and
a second ice-detection sensor positioned in the second zone and configured to detect ice accreted on the second zone;
wherein the control system is responsive to the second ice-detection sensor and is configured to control the operation of the second de-icing apparatus;
wherein a sensor head of each respective ice-detection sensor is positioned behind the window in each respective zone,
each respective ice-detection sensor is in a form of a sensor module including the respective sensor head,
each window is elongated, having longitudinal ends in a longitudinal direction,
each respective sensor head having a front face and a first abutment and a second abutment, each abutment positioned at a respective one of the longitudinal ends of the window and terminating prior to a front face of the window,
each sensor module positioned behind the respective window of the respective zone such that the respective sensor head front face is covered by the respective window, and
the window front face in each respective zone is convex so as to be aero-conformal with an adjacent part of the leading edge of the airframe component.

20. The aircraft of claim 19, wherein the control system of the ice-protection system is configured to activate automatically a sequence of operation of the de-icing apparatuses in response to the ice-detection sensors without requiring manual activation.

\* \* \* \* \*

UNITED STATES PATENT AND TRADEMARK OFFICE
CERTIFICATE OF CORRECTION

PATENT NO. : 10,232,949 B2
APPLICATION NO. : 14/770837
DATED : March 19, 2019
INVENTOR(S) : Peter English, Thomas Stephen Rowe Richards and David John Armstrong

It is certified that error appears in the above-identified patent and that said Letters Patent is hereby corrected as shown below:

In the Claims

Column 11, in Lines 31-32, Claim 1 delete "each window is elongated, having longitudinal ends in a longitudinal direction,".

Column 14, in Lines 1-2, Claim 19 delete "each window is elongated, having longitudinal ends in a longitudinal direction,".

Signed and Sealed this
Fourteenth Day of May, 2019

Andrei Iancu
*Director of the United States Patent and Trademark Office*